(12) United States Patent
Noldus et al.

(10) Patent No.: US 8,417,228 B2
(45) Date of Patent: Apr. 9, 2013

(54) TECHNIQUE FOR REQUESTING AND PROVIDING IN-CALL SERVICES

(71) Applicant: Telefonaktiebolaget L M Ericsson (Publ), Stockholm (SE)

(72) Inventors: Rogier August Caspar Joseph Noldus, Goirle (NL); Pieter van Rijnsoever, Milton (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/627,729

(22) Filed: Sep. 26, 2012

(65) Prior Publication Data

US 2013/0029700 A1    Jan. 31, 2013

Related U.S. Application Data

(63) Continuation of application No. 12/678,236, filed on Apr. 13, 2010, now Pat. No. 8,301,128.

(51) Int. Cl.
*H04M 3/42* (2006.01)
*H04M 3/00* (2006.01)
*H04W 4/00* (2009.01)
*H04B 1/38* (2006.01)

(52) U.S. Cl. ..... 455/415; 455/418; 455/466; 455/432.3; 455/557

(58) Field of Classification Search ............... 455/414.1, 455/414.4, 432.1, 415–416, 418, 433–434, 455/435.1, 456.1–456.6, 458–459, 461, 466, 455/515–519, 550.1, 556.2, 557–558, 560–561, 455/567; 379/88.05–88.06, 88.08, 88.12, 379/88.19
See application file for complete search history.

(56) References Cited

U.S. PATENT DOCUMENTS

| | | | | |
|---|---|---|---|---|
| 5,966,653 | A * | 10/1999 | Joensuu et al. | 455/445 |
| 5,999,825 | A * | 12/1999 | Geulen | 455/560 |
| 6,085,105 | A * | 7/2000 | Becher | 455/517 |
| 6,192,237 | B1 * | 2/2001 | Clapton et al. | 455/422.1 |
| 6,330,445 | B1 * | 12/2001 | Skog et al. | 455/433 |
| 7,386,107 | B2 * | 6/2008 | Colson et al. | 379/201.02 |
| 7,505,767 | B2 * | 3/2009 | Zabawskyj et al. | 455/432.1 |
| 8,249,054 | B2 * | 8/2012 | Witzel et al. | 370/352 |
| 8,270,957 | B2 * | 9/2012 | Franco et al. | 455/416 |
| 8,275,119 | B2 * | 9/2012 | Kahn | 379/350 |
| 8,301,128 | B2 * | 10/2012 | Noldus et al. | 455/415 |
| 2003/0185366 | A1 * | 10/2003 | Duncan | 379/142.17 |
| 2005/0107100 | A1 * | 5/2005 | Gustafsson et al. | 455/419 |
| 2008/0064385 | A1 * | 3/2008 | den Hartog et al. | 455/422.1 |
| 2008/0176586 | A1 * | 7/2008 | George et al. | 455/466 |
| 2010/0046501 | A1 * | 2/2010 | Witzel et al. | 370/352 |

* cited by examiner

*Primary Examiner* — Meless Zewdu

(57) ABSTRACT

A technique for requesting and providing in-call services encompasses a method of calling an information service during an ongoing call between two or more call parties. The method comprises the steps of receiving, during the ongoing call, a message from a first call party, determining that the message requests the provision of information associated with a second call party, obtaining a first identifier indicative of the second call party and sending a service request including the first identifier to the information service.

17 Claims, 5 Drawing Sheets

TECHNIQUE FOR REQUESTING AND PROVIDING IN-CALL SERVICES

RELATED APPLICATIONS

This application is a continuation of co-pending U.S. patent application Ser. No. 12/678,236 filed Apr. 13, 2010, which is a 371 of International Application No. PCT/EP2007/008203, filed Sep. 20, 2007, the disclosures of which are fully incorporated herein by reference.

TECHNICAL FIELD

The present invention relates to the field of service provision in a communication network. In particular, the invention relates to a technique for requesting and providing services during an ongoing call.

BACKGROUND

For parties engaged in a voice or multimedia call it is often desirable to obtain call-related information while the call is still ongoing. Such call-related information may include the name and address of one of the parties or geographical information leading the way to one of the parties (e.g. map or route information). In order to initiate an in-call inquiry, one of the parties involved in the call will first enter a service request possibly including an identifier of the requested information in his or her user terminal. This service request will then be transferred to a network server hosting the requested information.

To a limited extent, current telephone networks already provide mechanisms for generating in-call service requests. One possibility that can be mentioned in this regard is the Short Message Service (SMS) well-known from conventional Global System for Mobile communication (GSM) networks. A Short. Message is compiled by operating the keyboard of the user terminal (typically by manually typing in a character sequence). It is, however, error prone and cumbersome for a user to type in a Short Message while being engaged in a call.

Somewhat more user-friendly is the generation of service requests using Internet browsers. Today, General Packet Radio Service (GPRS) and Universal Mobile Telecommunication System (UMTS) networks provide browsing functionalities also for mobile devices such as mobile telephones or personal digital assistants. Nevertheless, operating an Internet browser while talking on the telephone is disturbing and time consuming.

Another possibility for generating in-call service requests are Interactive Voice Response (IVR) systems. In an IVR system, a voice or tone recognition mechanism transforms audible user input into an electronic service request The use of an IVR system is generally unpractical for requesting in-call services as the user will have to place the ongoing call on hold while being connected to the IVR system.

SUMMARY

There is a need for a technique for requesting and providing in-call services that is more user-friendly.

According to a first aspect, this need is satisfied by a method of calling an information service during an ongoing call between two or more call parties, wherein the information service has access to information associated with the call parties. The is method comprises the steps of receiving, during the ongoing call, a message from a first call party, determining that the message requests the provision of information associated with a second call party, obtaining a first identifier indicative of the second call party, and sending a service request including the first identifier to the information service.

The ongoing call may be a voice call or multimedia call. Moreover, the ongoing call could be a conference call involving three or more call parties. A call may be "ongoing" (i.e., a user terminal may be "in a call") from the time that signalling related to the establishment or attempted establishment of the call from or to a user terminal commences and before the call or call attempt ends.

The first call party requesting the provision of information will typically be different from the second call party that is associated with the requested information. However, in certain situations the second call party may be identical to the first call party. In other words, the first call party may request information about him- or herself, about his or her user terminal or about an associated network account (e.g. for locally storing the information on his or her user terminal or for forwarding the information to another user terminal).

The first identifier indicative of the second call party may be obtained in various ways. According to a first variant, the first identifier is fully or partially obtained from a local or a remote database. The first identifier may for example be retrieved from the database in response to receipt of the message from the first call party. Once retrieved, the first identifier may be added to the service request before the service request is sent. According to a second variant, that may be combined with the first variant, the first identifier is at least partially included in the message received from the first call party. In such a case, the step of sending the service request may include forwarding the message from the first call party to the information service. If necessary, further parts of the first identifier may be locally added to the message before the forwarding step.

The first identifier sent to the information service may comprise a network address of the second call party. Network addresses suitable as first identifiers include, for example, an International Mobile Subscriber Identity (IMSI) of the second call party, an International Mobile Equipment Identity (IMEI) of the user terminal operated by the second call party, a telephone number (such as a Mobile Subscriber ISDN number, MSISDN) of the second call party, a Universal Resource Identifier (URI) associated with the second call party, or an Internet. Protocol (IP) address of the second call party. In addition, or alternatively, the first identifier may comprise a directory name of the second call party. The directory name is typically a personal name of the second call party (such as a combination of the first name and the last name) as registered in an electronic telephone book or any other system database.

The above method may further comprise the steps of obtaining a second identifier indicative of the first call party (typically assuming that the first call party is different from the second call party), and sending the second identifier to the information service. Similar to the first identifier, the second identifier may comprise at least one of a network address of the first call party and a directory name of the first call party.

In one realisation, the second identifier is at least partially obtained from a database and added (in addition to the first identifier) to the service request sent to the information service. Moreover, the second identifier may at least partially be obtained via the initial message from the first call party. The second identifier may prompt the information service to send the requested information directly to the first call party. To this end, the second identifier may comprise a network address of the first call party.

According to a further implementation, the above method additionally comprises obtaining a third identifier indicative of the requested information, and sending the third identifier to the information service. The third identifier may at least partially be obtained from a database and/or directly via the initial message from the first call party. Moreover, the third identifier may be sent in the service request (together with the first identifier and the optional second identifier) to the information service.

In one variation, the third identifier indicates that a network address and/or a directory name of the second call party is requested. In another variation, the requested information relates to geographical information associated with the second call party. The geographical information may include street address information pertaining to the second call party, map information (e.g. a map showing the vicinity of the street address associated with the second call party), or route information (e.g. showing the way from a specific geographical site to the street address associated with the second call party).

The method may additionally comprise the initial step of establishing the call via a circuit-switched network such as a GSM network and/or a conventional wire-line telephone network. However, the method may also be practised in combination with a call stretching partially or completely through a packet-switched network. In this regard, Voice-over-IP (VoIP) technologies may be utilized.

The information service may be provided by a dedicated network node such as a remote network server. Alternatively, the information service may be provided by a local application (i.e. by an application co-located with the network component receiving the initial message from the first call party and determining that the message requests the provision of information associated with a second call party).

There exist various ways how the initial message can be generated and transmitted by the first call party. In one example, the Unstructured Supplementary Service Data (USSD) standard is utilised. The USSD standard is defined in the 3$^{rd}$ Generation Partnership Project (3GPP) Technical Specifications (TS) 22.090; "Unstructured Supplementary Service Data (USSD)-Stage 1", herein incorporated by reference as far as the format, generation and interpretation of USSD messages is concerned. Supplementary service control based on USSD messages is described in section 6.5 of 3GPP TS 22.030 V3.4.0 (2000-10); "Man-Machine-Interface (MMI) of the User Equipment (UE)", herein incorporated by reference.

According to a second aspect, a method of operating an information service during an ongoing call between two or more call parties is provided, wherein the information service has access to information associated with the call parties. The method comprises the steps of receiving, during the ongoing call a service request that has been initiated by a first call party, analysing the service request to determine an identifier relating to a second call party for which information is requested, obtaining information associated with the identifier and relating to the second call party, and sending the information towards the requesting first call party.

The step of sending the information towards the requesting first call party may include sending the information directly to a user terminal operated by the first call party (e.g. via a network address associated with this user terminal). Alternatively, the information may be routed over an intermediate network node arranged between the information service and the user terminal operated by the first call party (e.g. via a network address associated with the intermediate network node). This intermediate network node may for example be a network node performing one or more of the steps of the method according to the first aspect described above.

The information may be sent towards the requesting first call party in various ways. In one example, the information is sent via a message service (e.g. as an SMS message, a USSD message or a Multimedia Messaging Service, MMS, message).

The solutions presented herein may be practised in the form of software, as hardware implementations, or as software-hardware combinations. As for a software realisation, a computer program product comprising program code portions for implementing the steps of any of the methods presented herein when the computer program product is executed on one or more computing devices is provided. The computing devices may, for example, comprise a Mobile Switching Center (MSC), a dedicated network server, a user terminal or any other network component.

The computer program product may be stored on a computer readable recording medium, such as a permanent or re-writable memory within or associated with a computing device, or a removable CD-ROM or DVD. Additionally, or alternatively, the computer program product may be provided for download to a computing device, for example via a network such as the Internet.

According to a further aspect, a network device for calling an information service during an ongoing call between two or more call parties is provided, wherein the information service has access to information associated with the call parties. The network device comprises a first interface adapted to receive, during the ongoing call, a message from a first call party, a message handler adapted to determine that the message requests the provision of information associated with a second call party, a component adapted to obtain an identifier indicative of this second call party, and a second interface adapted to send a service request including the identifier to the information service. The network device may be constituted by or implemented in an MSC. The MSC may be included in the call path of the ongoing call and thus have mil-related knowledge about, for example, the call parties.

According to a still further aspect, a network server for providing information during an ongoing call between two or more call parties is provided, wherein the network server has access to information associated with the call parties. The network server comprises a first interface adapted to receive, during the ongoing call, a service request that has been initiated by a first call party, an analyser adapted to analyse the service request to determine an identifier relating to a second call party for which information is requested, a processor adapted to obtain information associated with the identifier and relating to the second call party, and a second interface adapted to send the information towards the requesting first call party.

According to a first variant, the network server is co-located with the network device calling the information service provided by the network server. According to another variant, the network server providing the information service is located remotely from the network device calling the information service. In such a case, the network server may be realized as a central network component providing the information service to a plurality of remote network devices.

BRIEF DESCRIPTION OF THE DRAWINGS

In the following, the above aspects will be described in more detail with reference to exemplary embodiments illustrated in the figures, in which.

DETAILED DESCRIPTION

In the following description, for purposes of explanation and not limitation, specific details are set forth (such as particular communication protocol standards and messaging sequences) in order to provide a thorough understanding of the solutions presented herein. It will be apparent to one skilled in the art that the solutions presented herein may be practised in other embodiments that depart from these specific details. For example, the skilled artisan will appreciate that while some of the embodiments are illustrated in context with the USSD messaging standard, other messaging standards may be used instead.

Moreover, those skilled in the art will further appreciate that functions explained herein below may be implemented using individual hardware circuitry, using software as functioning in conjunction with a general purpose computer or a programmed microprocessor, using an Application Specific Integrated Circuit (ASIC) and/or using one or more Digital Signal Processors (DSPs). It will also be appreciated that while the current solutions are partly described as methods, they may also be embodied in a computer processor and a memory coupled to the processor, wherein the memory is encoded with one or more programs that perform various of the method steps disclosed herein when executed by the processor.

Figure 1:
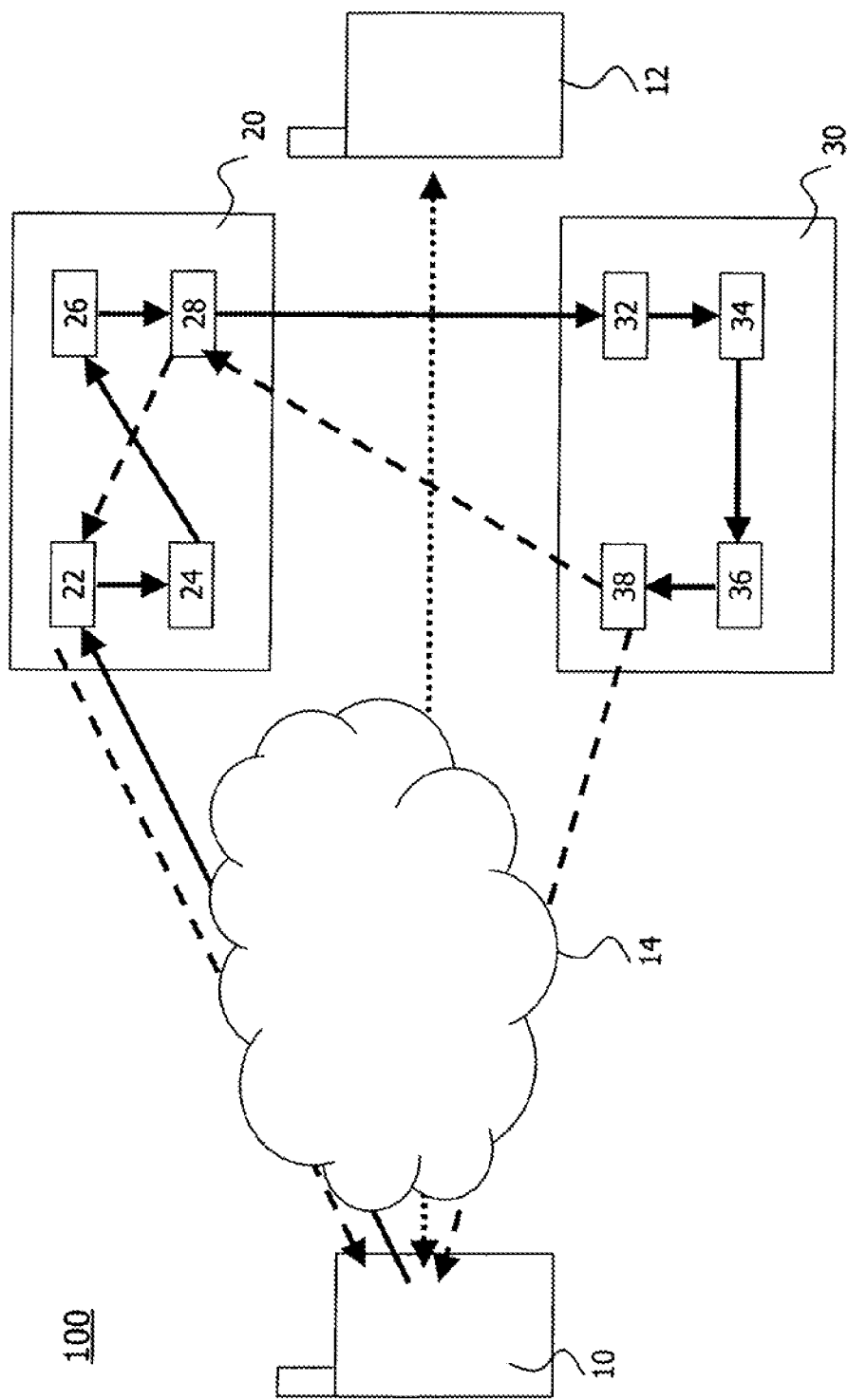
FIG. 1 illustrates a network system including various device embodiments.

FIG. 1 schematically illustrates a network system 100 with various device embodiments. The network system 100 comprises a first user terminal 10 operated by a first call party and a second user terminal 12 operated by a second call party. The user terminals 10, 12 may be stationary or mobile devices. In the embodiment shown in FIG. 1, the user terminals 10, 12 are configured as mobile telephones involved in an ongoing call (as indicated by a dotted line). The call stretches through a wireless or wire-line communication network 14.

The network system 100 further comprises a network device 20 and a network server 30. The network device 20 and the network server 30 may be part of the communication network 14. Alternatively, the network device 20 and the network server 30 may be constituted by components external to the communication network 14. The network device 20 may be included in the call path of the ongoing call between the two user terminals 10, 12 (and thus have knowledge about the identities of the two call parties).

As shown in FIG. 1, the network device 20 comprises a first interface 22 directed, via the communication network 14, towards the user terminal 10 operated by the first call party. The first interface 22 is adapted to receive, during the ongoing call, a message initiated by the first call party. The network device 20 further comprises a message handler 24 adapted to correlate the message received via the first interface 22 with the ongoing call and to determine that the message requests the provision of information associated with the second call party operating the other user terminal 12.

Another component 26 of the network device 20 is adapted to obtain an identifier indicative of the second call party. To this end, the component 26 may have access to a database (not shown in FIG. 1) that has been set up for call handling purposes. Alternatively, the component 20 may obtain the identifier indicative of the second call party via the message received by the first interface 22. According to a third option, the identifier is partially included in the message and partially retrieved by the network device 20 from a database. A second interface 28 of the network device 20 is adapted to send a service request including the identifier to the network server 30 which provides the requested information service.

As shown in FIG. 1, the network server 30 has a first interface 32 adapted to receive the service request sent by the network device 20. An analyzer 34 of the network server 30 is adapted to analyze the service request to determine the identifier identifying the call party about which information is requested.

The identifier determined by the analyzer 34 is forwarded to a processor 36 that is adapted to obtain information associated with the identifier and relating to the second call party. To this end, the processor may access a local database (not shown In FIG. 1) of the network server 30. Alternatively, or in addition, the processor 36 may send an information request message to another network device or network database to obtain the requested information.

The network server 30 is configured to transmit, once the requested information has been obtained, this information, by a second interface 38, towards the user terminal 10 of the requesting call party. As indicated by the dashed lines in FIG. 1, the information may be transferred either directly, via the communication network 14, to the user terminal 10, or the information may be routed via the network device 20 to the user terminal 10.

Figure 2:
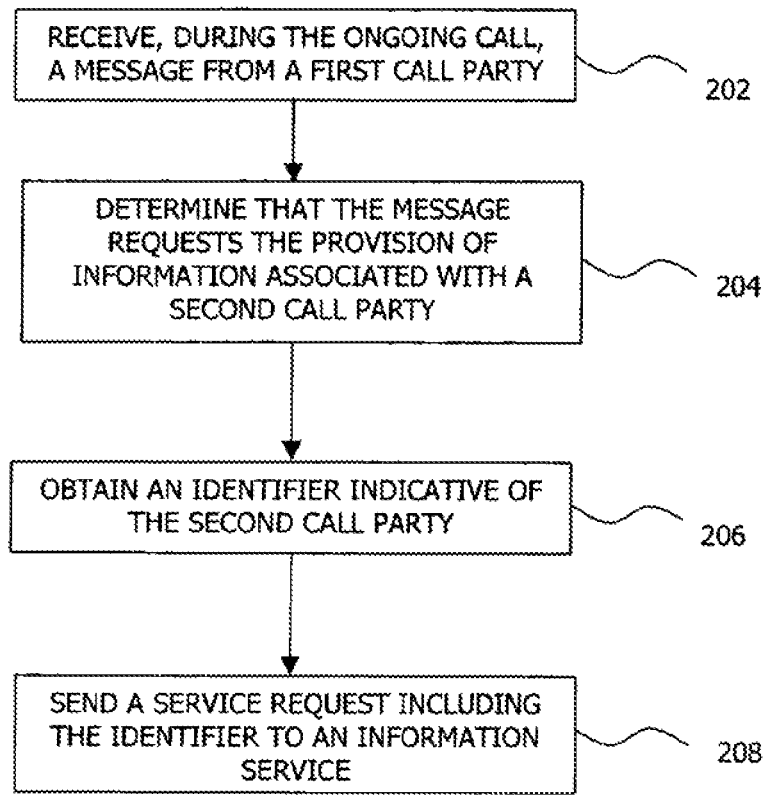
FIG. 2 illustrates a schematic flow diagram according to a first method embodiment.

FIG. 2 shows a schematic flow diagram of a first method embodiment. This method embodiment may be practised by the network device 20 shown in FIG. 1 or by any other device in context with calling an information service during an ongoing call between two or more call parties.

The method starts with receiving, during the ongoing call, a message from a first call party (step 202). In a next step 204, the message is analyzed to determine whether it constitutes a request for the provision of information associated with a second call party. Then, at least a first identifier indicative of the second call party is obtained in step 206. In addition to the first identifier, a second identifier indicative of the requesting first call party and/or a third identifier indicative of the requested information may be obtained at this time.

In a further step 208, a service request including the first identifier and, if available, the second and/or third identifier is sent to the information service. It should be noted that one or both of the second and third identifiers could also be transferred to the information service separately from the service request.

Figure 3:
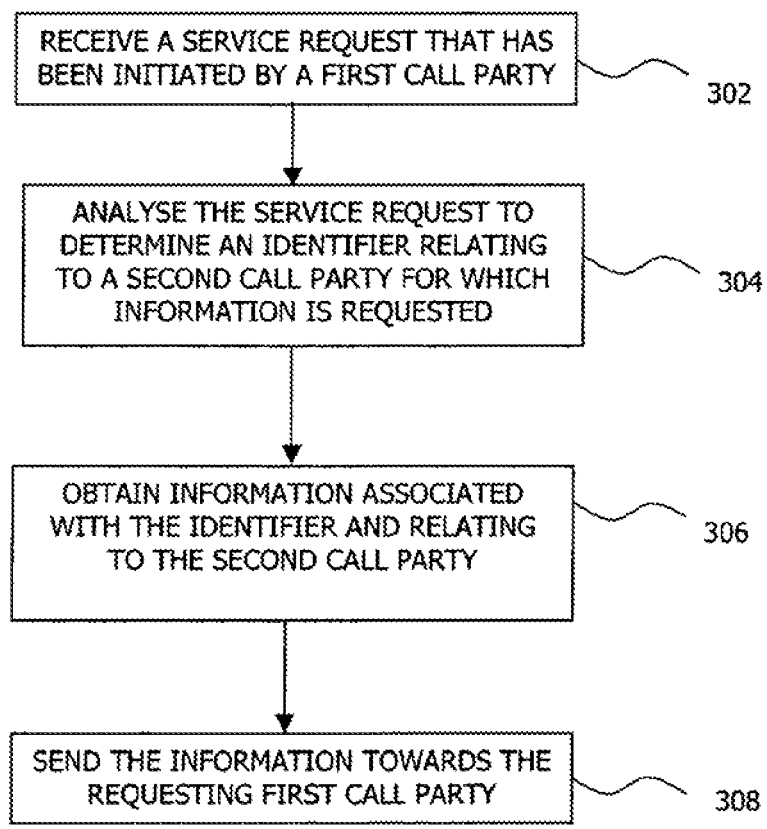
FIG. 3 illustrates a schematic flow diagram according to a further method embodiment.

FIG. 3 shows a schematic flow diagram of another method embodiment that may be practised by the network server 30 shown in FIG. 1 or by any other device capable of providing information regarding the parties involved in an ongoing call. The method embodiment illustrated in FIG. 3 may be performed in response to the method embodiment shown in FIG. 2.

With reference to FIG. 3, the method starts with receipt of a service request in step 302. The service request has been initiated by a first one of the call parties.

In a next step 304, the service request is analyzed to determine at least a first identifier that relates to a second call party for which information is requested. As mentioned above, the service request may include or may be accompanied by a second identifier indicative of the first call party and/or a third identifier indicative of the requested information. The requested information may pertain to a directory name and/or network address of the second call party. Alternatively, or in addition, the requested information may relate to geographical information associated with the second call party, including street address information, map information and route information. The requested geographical information may, in one particular case, also relate to the first call party.

Once the identifier has been determined in step 304, the requested information associated with the identifier is obtained (step 306). Obtaining the requested information may include a look-up process in a local database or a messaging procedure with a remote database.

After the information has been obtained in step 306, the information is sent in a next step 308 towards the requesting first call party. To this end, a messaging service (such as SMS or MMS) may be used.

In the following, a further embodiment will be discussed with reference to FIGS. 4 to 8. The further embodiment can be combined with the embodiments illustrated in FIGS. 1 to 3.

Figure 4:
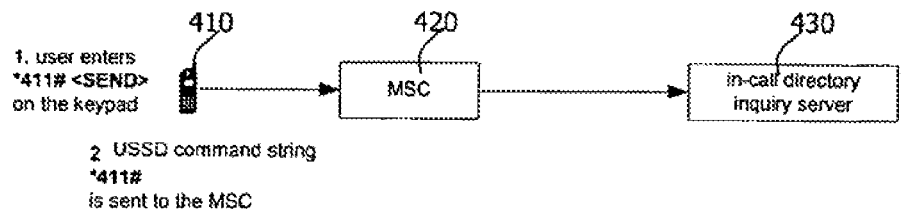
FIG. 4 illustrates a signalling flow implemented in one embodiment.
Figure 5:
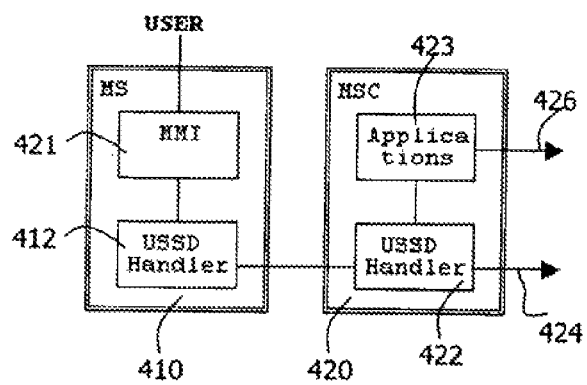
FIG. 5 schematically illustrates the implementation of message handlers for implementing some embodiments.

FIG. 4 shows the main components involved in the further embodiment, namely a mobile user terminal (or Mobile Station, MS) 410, an MSC (or MSC server, MSC-S) 420 as well as an in-call directory inquiry server 430. Both the user terminal 410 and the MSC 420 support the USSD standard. To this end, the user terminal 410 and the MSC 420 each comprises a local USSD message handler 412, 422 on a lower protocol layer as shown in FIG. 5. On a higher protocol layer of the user terminal 410, a Man-Machine Interface (MMI) 421 is functionally located between the user and the local USSD message handler 412. The MMI 421 can be configured as a keyboard or as a voice recognition system. As also shown in FIG. 5, the MSC 420 comprises various applications 423 on top of the local USSD message handler 422. The applications can be called by the USSD message handler 422 to execute predefined functions locally at the MSC 420.

Every USSD message generated over the MMI 421 by the USSD message handler 412 of the user terminal 410 includes a service code as will be explained in more detail below. Depending on the USSD service code included in the USSD message, the USSD handler 422 of the MSC 420 either forwards the USSD message to the Home Location Register (HLR) in the Home Public Land Mobile Network (HPLMN) of the served user (as indicated by arrow 424) or forwards the USSD message to one of the applications 423 to process the USSD message locally within the MSC 420. Local processing of the USSD message by one of the applications 423 may include the generation of a service request to an external network server (as indicated by arrow 426). In the present embodiment, arrow 426 denotes the transmission of a message to the in-call directory inquiry server 430 of FIG. 4.

While in the embodiment shown in FIG. 5 the applications 423 are shown to be located internally within the MSC 420, it should be noted that applications external to the MSC 420 could be utilized also for the purposes explained herein. In scenarios with one or more local applications 423 or with one or more applications external to the MSC 420, the messaging protocol used between the USSD message handler 422 within the MSC 420 and the local or external applications 423 could be the Mobile Application Part (MAP) protocol or the Lightweight Directory Access Protocol (LDAP). The MAP protocol, as specified in 3GPP TS 29.002; "Mobile Application Part," is conventionally used for the USSD message transfer between MSCs and HLRs and between HLRs and external USSD message handlers. Therefore, the MSC 420 will typically support the MAP standard anyway, and MAP may in particular be used to forward any USSD messages from the USSD message handler 422 within the MSC 420 to an external application.

LDAP, on the other hand, defines a standard interface for accessing hierarchical directories. LDAP has evolved from ITU-T recommendation X.500; "Information Technology—Open Systems Interconnection—the Directory: Overview of concepts, models and services". While the use of MAP for conveying a USSD message is standardized, the use LDAP has not been standardized yet for this purpose and might thus require separate definitions.

In the following, the processing steps and signalling flows in context with an in-call invocation of an information service provided by the in-call directory inquiry server 430 of FIGS. 4 and 6 to 8 will be discussed in more detail. In the context of this discussion, it will be assumed that the mobile user terminal 410 is currently involved in a call with a fixed or likewise mobile second user terminal (not shown in FIGS. 4 to 8; see FIG. 1, user terminals 10 and 12 and dotted line). The call stretches through a circuit-switched GSM network and involves in a conventional manner the MSC 420 as switching component. It will further be assumed that the call party operating the user terminal 410 wishes to obtain information associated with the call party operating the other user terminal. This information may include contact details of the other call party (such as name, telephone/telefax number(s), an e-mail address, a URI, street address information, route information and map information).

For calling the remote in-call information service, the user operating the user terminal 410 has to enter a USSD service code on the keypad of the user terminal 410 that will be sent in a USSD activation message towards the network (or, more specifically, to the MSC 420). The format of a USSD activation message is described in section 6.5 of 3GPP TS 22.030 V3.4.0 (2000-10): a USSD activation message starts with "*" and ends with "#", and each part within the activation message is separated by "*". In its most general version, a USSD activation message thus has the format "*SC*SI#", with SC standing for the Service Code (two or three digits) and SI standing for optional Supplementary Information (having a variable length).

In the present embodiment, it will be assumed that the information service provided by the in-call directory inquiry server 430 is associated with the service code 411. Accordingly, when the user of the mobile terminal 410 wishes to use the information service provided by the in-call directory inquiry server 430, the process of calling this service starts with the user entering the string "*411#" on the keypad of the user terminal 410 during the ongoing call (step 1 in FIG. 4). After the string has been entered, the user presses the <SEND> key on the keyboard (step 2 in FIG. 4). Pressing this key will in the present case not lead to call establishment, but the user terminal 410 (i.e. the local USSD message handler 412 shown in FIG. 5) will instead send the USSD string to the MSC 420.

At the MSC 420, the local USSD message handler 422 will receive the USSD message and will analyze the USSD service code included therein. The USSD message handler will determine that the service code "411" does not belong to a predefined service code range for which the USSD message has to be forwarded to the HLR in the HPLMN (arrow 424 in FIG. 5). Rather, the USSD message handler 422 of the MSC 420 determines that the service code "411" belongs to a predefined service code range for which the USSD message has to be processed locally. For this reason, the USSD message handler 422 initiates execution of the specific local application 423 associated with the service code 411 (see FIG. 5).

Figure 6:
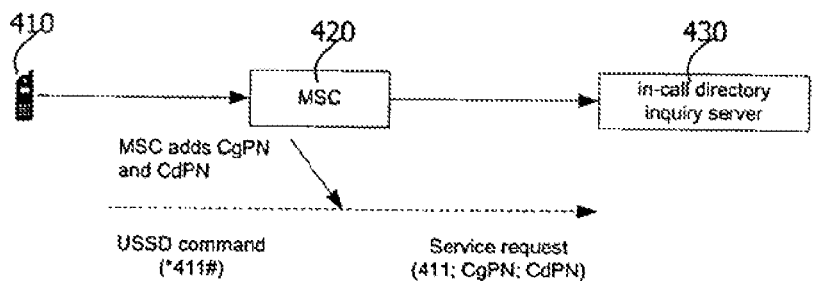
FIGS. 6 to 8 illustrate various further signalling flows implemented in some embodiments.

Execution of the corresponding application 423 within the MSC 420 will result in the actions illustrated in FIG. 6. These actions include the retrieval of the telephone number (MSISDN) of the second (i.e., opposite) call party about which information is requested, the insertion of the telephone number in a service request, and the transmission of the service request to the in-call directory inquiry server 430 (as indicated by arrow 426 in FIG. 5). The operation of the application 423 in this regard will depend on whether the previously established call was originated by the user or (autonomously) by the mobile terminal 410 (Mobile Originated, MO, call) or the call was originated by the remote user terminal and terminates at the user terminal 410 (Mobile Terminating, MT, call) as will be described in more detail below. In both cases, the application 423 running on the MSC 420 will add in the present embodiment both the Calling Party Number (CgPN) and the Called Party Number (CdPN) plus the service code "411" to the service request before forwarding it to the in-call directory inquiry server 430.

In the case of a MO call, the CgPN represents the calling party on whose behalf the inquiry is performed and who is to receive the requested content. The CdPN relates to the person whose contact details are requested. In the MT call case on the other hand, CgPN relates to the person whose contact details are requested and CdPN represents the called party on whose behalf the inquiry is performed and who is to receive the requested content. Therefore, the service request includes two dedicated information element fields "Queried Subscriber" and "Served Subscriber", which are selectively associated with either the CgPN or the CdPN as follows. For MO calls, the information element field "Queried Subscriber" identifies the call party whose contact details are requested. Consequently, this information element field carries the CdPN. The information element field "Served Subscriber", on the other hand, will carry the CgPN. For MT calls, the information element field "Queried Subscriber" will carry the CgPN, and the information element Reid "Served Subscriber" will carry the CdPN.

As will be appreciated, the insertion of CgPN and/or CdPN in the service request by the MSC 420 reduces the input requirements on the side of the user terminal 410. In other words, the user operating the user terminal 410 is disburdened from having to enter this information during the ongoing call, which renders the service initiation process more user friendly. The MSC 420, which is in charge of the ongoing call, may easily retrieve CgPN and/or CdPN from its internal call handling process as this information is stored in databases accessible by the MSC 420.

The following specifics of MO calls and MT calls will be considered by the MSC 420 when generating the service request. In the MO call case, when the MSC 420 has modified the CdPN prior to setting up the call, the MSC 420 shall use the modified number in the USSD service request sent to the in-call directory inquiry server 430.

If, in the MO case, the MSC 420 has received the Connected Line Identity (COL) from the other call party, then the MSC 520 forwards the COL to the in-call directory inquiry server 430 instead of (or in addition to) the CdPN. The COL will identify the "connected party" even when call forwarding has taken place. If the presentation indication of the COL is set to "restricted" (e.g. because the connected party has applied Connected Line Identification Restriction, COLR), then the MSC 420 deduces that the connected party wishes to remain anonymous. The MSC 420 will in this case not use the COL for the USSD service request. The MSC 420 may, however, still use the CdPN. If the COL is set to "presentation restricted" but the requesting user has the "COLR override" feature, then the MSC 420 may, as an implementation option, still include the COL in the USSD service request.

As for the MT call case, the presentation indicator of the CgPN could likewise be set to "restricted" (e.g. because the calling party has applied Calling Line Identification Restriction, CUR). In such a case, the MSC 420 deduces that the calling party wishes to remain anonymous. The MSC 420 may disregard the information request from the is calling party in this case. If the CLI is set to "presentation restricted" but the requesting user has the "CLIR override" feature, then the MSC 420 may, as an implementation option, still include the CU in the USSD service request.

Figure 7:
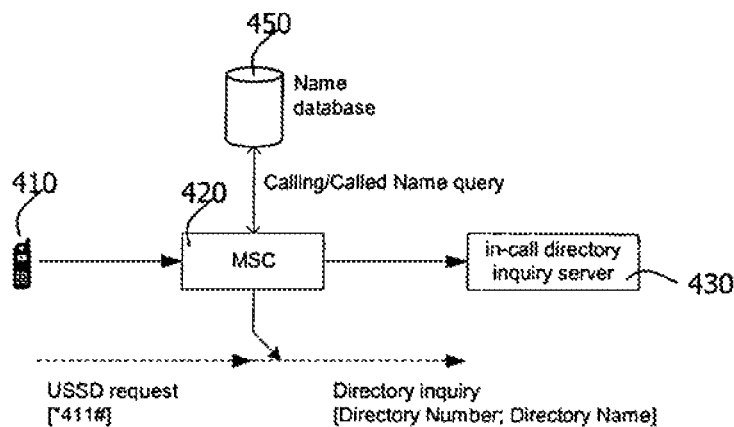

National regulations may not allow for obtaining contact details upon supplying a directory number such as CgPN and CdPN. In such a case, often a directory name has (additionally) to be provided. In order to meet this requirement, the mechanism illustrated in FIG. 6 may be combined with the Calling Name Presentation (CNAP) supplementary services as depicted in FIG. 7. Therefore, extending the embodiment shown in FIG. 6, the MSC 420 may additionally be provided with access to a CNAP database 450 as shown in FIG. 7. CNAP is specified in 3GPP TS 23.096; "Name Identification Supplementary Service".

Conventionally, the name database 450 underlying the CNAP supplementary service is used to obtain the Calling Name. In the context of the present invention, the CNAP database 450 is used for obtaining one or both of the Calling Name and the Called Name. In other words, the CNAP database 450 is queried both in the MO call case and the MT call case. The CNAP database 450 will thus be used as a name directory.

In response to receipt of the USSD request with the service code "411", the MSC 420 queries the CNAP database 450 to retrieve either one or both of the Calling Name (MT call case) or the Called Name (MO call case). In a further step, a service request (directory inquiry) is generated that includes both the retrieved name (directory name) as well as the telephone number (directory number) of at least the party whose contact details are requested. This telephone number will generally be available from the internal call handling process of the MSC 420. The service request thus generated satisfies the legal requirements indicated above and can be sent as directory inquiry to the in-call directory inquiry server 430.

In the embodiments shown in FIGS. 6 and 7, additional information may be transferred from the MSC 420 to the in-call directory inquiry server 430 together with the service request (or separate therefrom). In one example, a language code is added to the service request. Especially in multi-language countries such as Canada, a network operator may provide a language code in the HLR data maintained for an individual subscriber. A subscriber may thus be marked either as "English" or "French". This language code is typically transferred to the Visitor Location Register (VLR) during registration and is used, amongst others, to select an appropriate language for standardised textual or audio announcements. Therefore, the MSC 420 is may add a language code to the service request before sending the service request to the in-call directory inquiry server 430. The server 430 may then format the contact details in accordance with the preferred language before transferring them towards the user terminal 410.

Figure 8:
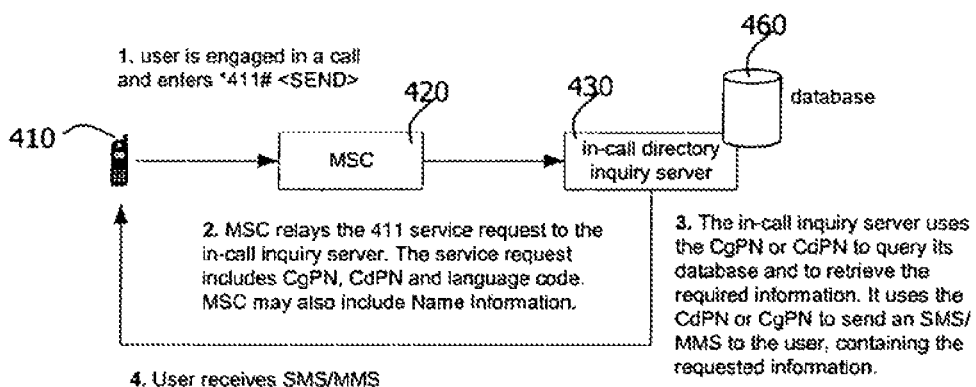

FIG. 8 illustrates the operational steps performed by the in-call directory inquiry server 430 (with access to a directory database 460) upon receipt of the service request from the MSC 420. In a first step, the server 430 analyses the service request to differentiate between the party who requested the contact details and the party whose contact details are requested. As mentioned above, the call case determines the function and usage of CgPN and CdPN included as information elements "Queried Subscriber" and "Served Subscriber" in the service request.

Depending on the call case, the in-call inquiry server 430 uses either the CgPN or the CdPN as database key to query the database 460 and to retrieve the required information (i.e. the requested contact details in the present embodiment). Once the information has been obtained, the server 430 uses the other of the CdPN or CgPN to send an SMS or an MMS containing the requested information directly to the user terminal 410 as indicated in FIG. 8.

The requested contact details can be sent to the user terminal 410 in various formats. The contact details could for example be sent in a text format or in a vCard format. vCard is a standardised format for representing address information and may be transferred via SMS to GSM and other user terminals 410. The user terminal 410 is configured to unpack the SMS and to add the contact details (i.e. the contents of the vCard) to the internal address book of the user terminal 410.

The utilisation of dedicated service codes permits the user terminal 410 to signal to the network a specific address format in which the contact details should be provided. For example, the service code "411" may be used to signal that the contact details should be packed in a text format, and the service code "412" may be used to signal that the contact details are to be formatted according to the vCard standard. Receiving the requested information in the vCard form will often be preferred as it simplifies the transfer of the received contact details into the local address book.

It should be noted that the directory inquiry may also be performed outside the context of an ongoing call. In such a case, the user terminal 410 will have to transfer the directory number (typically a telephone number) for which the contact details for other information) are requested via the USSD message to the MSC 420. The USSD message sent from the user terminal 410 to the MSC 420 may thus have the following format:

*411*416 8378 9876#.

In this example, "416 8378 9876" is the directory number for which contact details are requested.

When the USSD based directory inquiry is used outside the context of a call, the MSC 420 may still add additional information to the service request before forwarding it to the in-call directory inquiry server 430. Such additional information may include the MSISDN of the requesting call party, the preferred language code and directory name information. The processing at the MSC 420 of the service request received from the user terminal 410 will thus be essentially similar to the processing discussed in the above embodiments with the exception that the directory number is already received with the USSD message from the user terminal 410.

As a further enhancement, the service request may be placed by the user terminal 410 using a circuit-switched call instead of a USSD message. In such a scenario, the user operating the terminal 410 may simply dial the designated directory inquiry number "411" (or another designated number). The MSC 420 then connects the user to an IVR system and the user is prompted by the IVR system to enter the directory number for which information is requested on the keypad of the user terminal 410.

The number entered in response to this prompt will then be forwarded by the MSC 420 to the in-call directory inquiry server 430. Similar with the USSD-based directory inquiry scenarios, the MSC 420 signals the CgPN and the language preference code to the server 430. In this regard, the CgPN may be placed in the designated information element field "Calling Party Number" of the ISUP Initial Address Message (IAM). The directory number (i.e. the number of the party about which information is requested) may be placed in the "Generic Number" field of the ISUP IAM. An indication of the language preference code may be reflected in the CgPN that is used to route the call to the server 430. In other words, different CdPNs may be used for establishing a directory inquiry for the purpose of indicating the preferred language.

As a further enhancement, the user terminal 410 may be configured to send the directory number by means of SMS. In this scenario, the directory number for which information is requested is inserted in the SMS, and the MSC 420 may then add additional information such as the MSISDN of the service requesting party to the service request before forwarding it to the in-call directory inquiry server 430.

As has become apparent from the above, the present embodiments generally reduce the amount of information a user has to enter manually in a service request. In this regard, some embodiments exploit the fact that a serving network node may correlate the service request with the ongoing call. The serving network node may then exploit this correlation to add further call-related information in the service request before forwarding it to a local or remote information service. This renders the whole information provisioning procedure more user friendly.

While the present solution has been described with respect to particular embodiments (including certain device arrangements and certain orders of steps within various methods), those skilled in the art will recognise that the present solutions are not limited to the specific embodiments described and illustrated herein. Therefore, it is to be understood that this disclosure is only illustrative and that any limitations can only result from the scope of the claims appended hereto.

The invention claimed is:

1. A method of requesting an information service during an ongoing call between two or more call parties, wherein the information service has access to information associated with the call parties, the method comprising the steps of:
a first call party of the two or more call parties sending a Unstructured Supplementary Service Data (USSD) activation message using a local message handler;
receiving the USSD activation message at a Mobile Switching Center (MSC), wherein a local MSC message handler analyzes a USSD service code included in the USSD activation message;
the local MSC message handler initiating execution of a specific local application associated with the USSD service code; and
transmitting a service request to an in-call directory inquiry server, wherein the in-call directory inquiry server provides information associated with the USSD service code, for transfer to the first call party.

2. The method of claim 1 including the MSC adding a language code in the information service request prior to sending the information service request to the in-call directory inquiry server.

3. The method of claim 2, the in-call inquiry directory server formatting contact details according to the language code prior to transferring the contact details to the first call party.

4. The method of claim 1, wherein the specific local application determines the requested information associated with a second call party.

5. The method of claim 1, wherein the MSC includes various applications on top of the MSC message handler, the various applications for executing predefined functions at the MSC.

6. The method of claim 1 wherein a second identifier associated with the first call party and a third identifier of the requested information is included in the service request that is sent to the in-call directory inquiry server or the second and third identifiers are transferred separately from the service request to the in-call directory inquiry server.

7. A network device for use in requesting an information service during an ongoing call between two or more call parties, wherein the information service has access to information associated with the call parties, the network device comprising:

a first interface for receiving an Unstructured Supplementary Service Data (USSD) activation message initiated by a first call party of the two or more call parties;

a message handler for correlating the received USSD activation message, via the first interface, with the ongoing call, the USSD activation message including a USSD service code requesting the provision of information associated with a second call party of said two or more call parties;

a component for obtaining an identifier of the second call party; and a second interface for sending a service request, the service request including the identifier of the second call party, to a network server which provides the requested information service.

8. The network device of claim 7, wherein the identifier of the second call party is obtained from one of:

the USSD activation message initiated by the first call party;

a database associated with the component and set up for call handling purposes; and the identifier being partially included in the message and partially in the database.

9. The network device of claim 7, wherein the identifier comprises at least one of a network address of the second call party and directory names of the second call party and the first call party.

10. The network device of claim 7, wherein the network device has means for transferring the requested information received from the network server to the first call party.

11. The network device of claim 7, wherein the requested information relates to geographical information associated with the second call party including street address information, map information, or route information.

12. The network device of claim 7, comprising a Mobile Switching Center or a Mobile Switching Center-Server.

13. The network device of claim 7, wherein a calling party number and a called party number is included in the service request prior to forwarding to the network server, the network server being an in-call directory inquiry server.

14. The network server of claim 13, wherein the network server formats contact details according to the language code prior to transferring the contact details to the first call party.

15. The network server of claim 13, the network server using the first call party number (CgPN) to query an associated database to retrieve the requested information.

16. The network server of claim 15, the network server using a second call party number (CdPN) to send an SMS or MMS containing the requested information to the first call party.

17. A network server for use in requesting an information service during an ongoing call between two or more call parties, wherein the information service has access to information associated with the call parties, the network server comprising:

a first interface for receiving an Unstructured Supplementary Service Data (USSD) service request during the ongoing call, from a first call party of the two or more call parties, via a network device;

an analyzer for analyzing the USSD service message to determine an identifier of a second call party of the two or more call parties about which information is requested and whether a language code is included;

a processor for obtaining information associated with the identifier and related to the second call party; and a transmitter for sending the identifier information related to the second call party to the first call party.

* * * * *

UNITED STATES PATENT AND TRADEMARK OFFICE
CERTIFICATE OF CORRECTION

PATENT NO.         : 8,417,228 B2
APPLICATION NO.    : 13/627729
DATED              : April 9, 2013
INVENTOR(S)        : Noldus et al.

It is certified that error appears in the above-identified patent and that said Letters Patent is hereby corrected as shown below:

In the Drawings:

In Fig. 7, Sheet 5 of 5, delete "Calllng/Called Name query" and insert
-- Calling/Called Name query --, therefor.

In the Specifications:

In Column 1, Lines 6-7, delete "co-pending U.S. patent application Ser. No. 12/678,236 filed Apr. 13, 2010," and insert -- U.S. patent application Ser. No. 12/678,236 filed Apr. 13, 2010, now U.S. Pat. No. 8,301,128, --, therefor.

In Column 1, Line 37, delete "Short." and insert -- Short --, therefor.

In Column 1, Line 53, delete "request" and insert -- request. --, therefor.

In Column 1, Line 66, delete "The is" and insert -- The --, therefor.

In Column 2, Line 46, delete "Internet." and insert -- Internet --, therefor.

In Column 4, Line 39, delete "mil-related" and insert -- call-related --, therefor.

In Column 5, Line 29, delete "software as" and insert -- software --, therefor.

In Column 6, Line 5, delete "20" and insert -- 26 --, therefor.

In Column 9, Line 40, delete "Reid" and insert -- field --, therefor.

In Column 9, Line 60, delete "520" and insert -- 420 --, therefor.

Signed and Sealed this
Eighteenth Day of June, 2013

Teresa Stanek Rea
*Acting Director of the United States Patent and Trademark Office*

CERTIFICATE OF CORRECTION (continued)
U.S. Pat. No. 8,417,228 B2

In Column 10, Line 9, delete "CUR)." and insert -- CLIR). --, therefor.

In Column 10, Line 11, delete "the is" and insert -- the --, therefor.

In Column 10, Line 15, delete "CU" and insert -- CLI --, therefor.

In Column 10, Line 59, delete "420 is" and insert -- 420 --, therefor.

In Column 11, Line 29, delete ""412"" and insert -- "411" --, therefor.

In Column 11, Line 38, delete "for other" and insert -- (or other --, therefor.

In the Claims:

In Column 12, Line 57, in Claim 2, delete "1" and insert -- 1, --, therefor.

In Column 13, Line 5, in Claim 6, delete "1" and insert -- 1, --, therefor.